US012215535B2

(12) United States Patent
Leonardo

(10) Patent No.: US 12,215,535 B2
(45) Date of Patent: Feb. 4, 2025

(54) IN-GROUND STORAGE SYSTEM AND METHOD

(71) Applicant: Derek Leonardo, Las Vegas, NV (US)

(72) Inventor: Derek Leonardo, Las Vegas, NV (US)

(73) Assignee: DXT Ventures, LLC, Las Vegas, NV (US)

( * ) Notice: Subject to any disclaimer, the term of this patent is extended or adjusted under 35 U.S.C. 154(b) by 188 days.

(21) Appl. No.: 18/101,099

(22) Filed: Jan. 24, 2023

(65) Prior Publication Data

US 2023/0235612 A1 Jul. 27, 2023

Related U.S. Application Data

(60) Provisional application No. 63/303,010, filed on Jan. 25, 2022.

(51) Int. Cl.
*E05G 1/026* (2006.01)

(52) U.S. Cl.
CPC .................................... *E05G 1/026* (2013.01)

(58) Field of Classification Search
CPC ............ E05G 1/005; E05G 1/02; E05G 1/026
See application file for complete search history.

(56) References Cited

U.S. PATENT DOCUMENTS

| | | | | | |
|---|---|---|---|---|---|
| 4,273,478 | A * | 6/1981 | Cedergren | E05G 1/14 406/189 |
| 4,454,824 | A * | 6/1984 | Wood | E05G 1/005 248/156 |
| 4,664,041 | A * | 5/1987 | Wood | E05G 1/005 109/51 |
| 5,353,206 | A * | 10/1994 | Fejes | E05B 65/104 362/394 |
| 5,735,430 | A * | 4/1998 | Gorman | E05G 1/00 220/256.1 |
| 6,135,034 | A * | 10/2000 | Clark | E05G 1/00 109/57 |
| 8,695,386 | B2 * | 4/2014 | Schulz | E05G 1/005 109/51 |
| 9,706,820 | B1 * | 7/2017 | Lopez | A45F 3/44 |
| 10,222,017 | B2 * | 3/2019 | Skiba | E05G 1/10 |
| 2017/0342763 | A1 * | 11/2017 | Yeh | E05G 1/024 |
| 2021/0285262 | A1 * | 9/2021 | Szrenko | E05G 1/005 |
| 2021/0309415 | A1 * | 10/2021 | DaCunha | E05G 1/005 |

* cited by examiner

*Primary Examiner* — Christopher J Boswell
(74) *Attorney, Agent, or Firm* — The Thornton Firm, LLC

(57) ABSTRACT

An in-ground storage system for storing valuables includes a cylindrically shaped outer container having a bottom, an annular upper rim and a substantially continuous side wall extending from the bottom and terminating at the annular upper rim, a cylindrically shaped inner container having a bottom, an annular upper rim and a substantially continuous side wall extending from the bottom and terminating at the annular upper rim, and a lid assembly including an outer sealing member having an outer lip portion with a substantially vertical outer wall, at least one gasket, and an inner sealing portion having a substantially vertical inner wall. A method for storing valuables using the storage system includes the steps of placing the outer cylinder into the ground, inserting valuables into the inner cylinder, securing the lid assembly to the inner and outer containers; and concealing the underground storage system from view.

20 Claims, 5 Drawing Sheets

IN-GROUND STORAGE SYSTEM AND METHOD

CROSS-REFERENCE TO RELATED APPLICATIONS

The present nonprovisional application claims priority benefit of the U.S. provisional application for patent Ser. No. 63/303,010 titled "Underground Storage System and Method" filed on Jan. 25, 2022 under 35 U.S.C. § 119(e). The contents of this related nonprovisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to storage containers. More specifically, the invention relates to a novel in-ground storage system and method for storing valuable objects.

2. Description of the Related Art

Concealable storage containers are well known in the art. Throughout history, people have been developing increasingly clever ways for storing valuable objects. Among the oldest methods for concealing and securing valuables is burying objects in a secret location.

The advantages of using containers to bury objects in the ground are numerous. First, buried objects are highly inconspicuous to thieves and passersby. Second, buried objects are far less prone to loss due to fires, storms, and earthquakes. Finally, burying valuable objects is a relatively inexpensive alternative to more common storage systems such as safes or safety deposit boxes.

Presently, there exists a need for an improved in-ground storage system and method for storing valuable objects. Such a system and method must be able to facilitate the easy insertion and removal of an in-ground storage container which prevents foreign objects such as dirt and rocks from entering the underground storage space. Such a system must be able to provide a waterproof container which ensures valuables stored therein will not be damaged during storage. Moreover, such a system must be an affordable alternative to more expensive systems currently known and understood in the art.

SUMMARY

The present invention fulfils the long-felt need for an improved in-ground storage system and method. At its essence, the invention comprises a cylindrically shaped outer container having a bottom, an annular upper rim and a substantially continuous side wall extending from the bottom and terminating at the annular upper rim, a cylindrically shaped inner container having a bottom, an annular upper rim and a substantially continuous side wall extending from the bottom and terminating at the annular upper rim, and a lid assembly including an outer sealing member having an outer lip portion with a substantially vertical outer wall, at least one gasket, and an inner sealing portion having a substantially vertical inner wall.

The invention further discloses a method for storing valuable objects in an in-ground storage system. The method comprises the steps of digging a hole in the ground; installing the outer container of the in-ground storage system into the ground; inserting valuables into the inner cylinder; securing the lid assembly to the inner container; inserting the lid assembly and inner container into the outer container; securing the lid assembly and inner container to the outer container; and covering the in-ground storage system with dirt, rocks, sand or other objects to conceal the in-ground storage system from view.

The principal object of the invention is to provide an inexpensive and effective means for storing valuable objects underground. In embodiments of the invention, a user can insert items into the system and bury the container. The in-ground storage system is designed to protect items from seepage of water, dirt, and debris using several different barriers of protection built into the system. When uncovered, a user can pull up the inner container and detach the lid for access without unburying the entire storage system.

BRIEF DESCRIPTION OF THE DRAWINGS

The invention directed by way of example, and not by way of limitation, in the figures of the accompanying drawings and in which like reference numerals refer to similar elements and in which.

Figure 1:
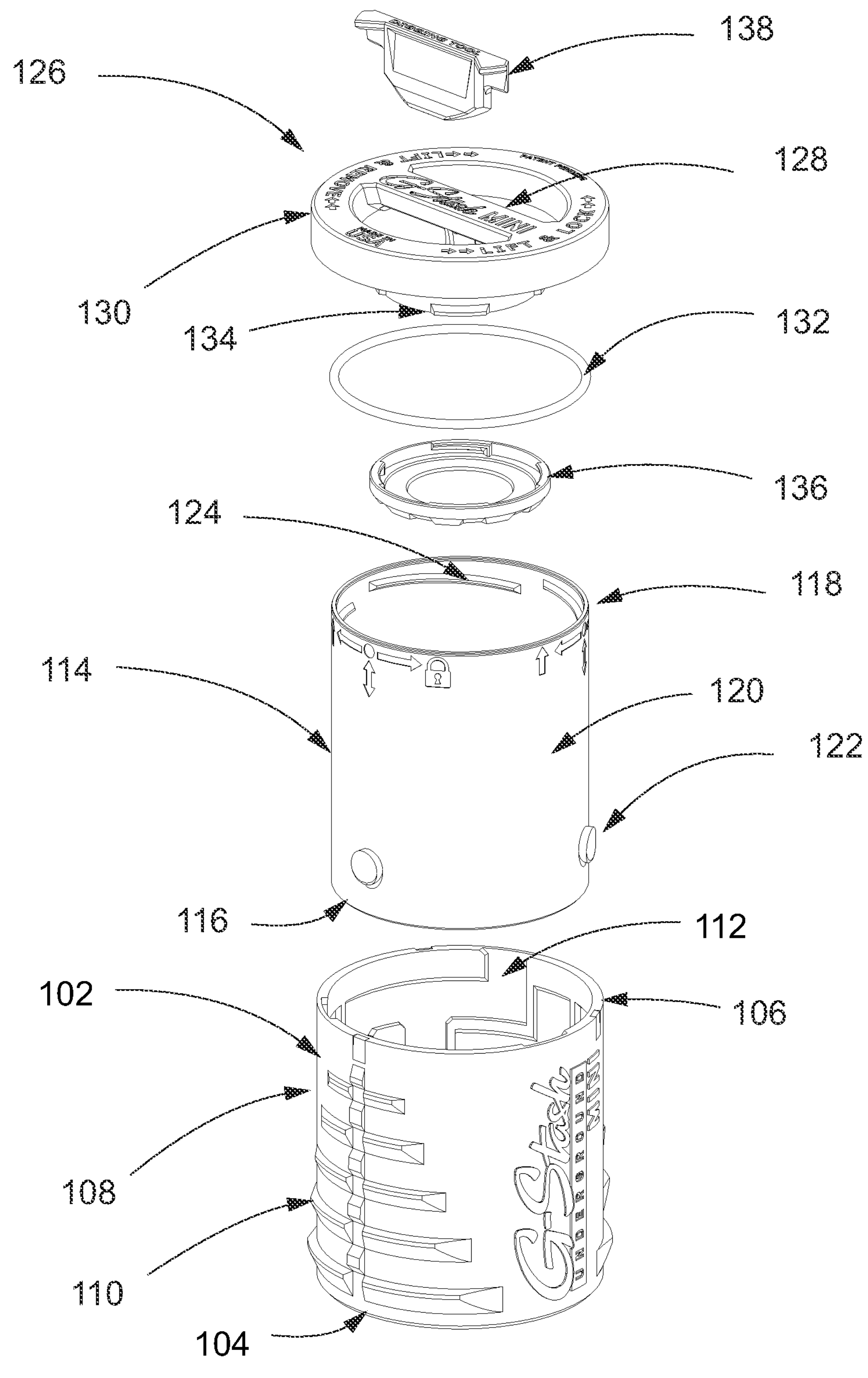
FIG. 1 is a perspective exploded view of an in-ground storage system in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

As is well known to those skilled in the art, many careful considerations and compromises typically must be made when designing the optimal manufacture or commercial implementation of such an in-ground storage system and method. A commercial implementation in accordance with the spirit and teachings of the invention may be configured according to the needs of the particular application, whereby any aspect(s), feature(s), function(s), result(s), component (s), approach(es), or step(s) of the teachings related to any described embodiment of the present invention may be suitably omitted, included, adapted, mixed and matched, or improved and/or optimized by those skilled in the art.

The exemplary in-ground storage system and method will now be described in detail with reference to embodiments thereof as illustrated in the accompanying drawings.

FIG. 1 is a perspective exploded view of an in-ground storage system in accordance with an embodiment of the invention. The invention consists of components capable of assembly into one unit.

The invention includes a cylindrically shaped outer container 102. The outer container 102 provides a protective outer shell and a guide to maintain sturdiness. The outer container consists of a bottom 104, an annular upper rim 106 and a substantially continuous side wall 108 extending from the bottom and terminating at the annular upper rim. The bottom 104 and the side wall define an internal cavity. The bottom may be attachable. The bottom may include a drainage system such as, but not limited to, a plurality of apertures through which fluid can pass. The cylindrically shaped outer container 102 can include anti-seepage and anti-condensation systems as well. In some embodiments, the bottom may be attachable by a threaded bottom.

The purpose of the outer container is to remain in the ground in place to be able to put an inner container bucket in and out of the ground. As such, the cylindrically shaped outer container includes one or more ribs 110 which provide added strength and durability. The ribs on the cylindrically shaped outer container are designed, shaped and angled to resist lateral and vertical movement while buried. A ribbed cylindrical outer container 102 is also more stable and less prone to shifting while buried in the ground.

The ribbed cylindrically shaped outer container includes a track system which allows an inner container to move freely up and down, in and out of the ground. The track system of the cylindrically shaped outer container 102 includes a plurality of grooves 112 located on the inner diameter of the said cylindrically shaped outer container. The plurality of grooves are configured to allow for the fitting and sliding of an inner container in such a manner where a cylindrically shaped inner container may extend from and retract into the cylindrically shaped outer container.

The invention further includes a cylindrically shaped inner container 114. The cylindrically shaped inner container 114 is a removable container in which personal valuable items are stored. The inner container 114 includes a bottom 116, an annular upper rim 118 and a substantially continuous side wall 120 extending from the bottom and terminating at the annular upper rim. The cylindrically shaped inner container is configured to telescopically slide into and from the cylindrically shaped outer container. The inner cylinder includes a plurality of radial pins extending from the outer diameter of the said cylindrically shaped inner container.

In one embodiment of the invention, the annular upper rim 118 includes a threaded upper end so as to create an attachment point for a lid assembly 126. In some embodiments, the bottom may be attachable by a threaded bottom. The bottom may have anti-seepage systems and anti-condensation systems as well.

In one embodiment of the invention, the cylindrically shaped inner container 104 has a plurality of radial pins 110 extending outward from the inner container near the bottom of the said inner container. The radial pins are configured to slide into a grooved track system outer located in the inner diameter of the outer container allowing movement and stability to the system. Such pins are designed to limit debris from crowding the track as well as to keep the inner container secured in various positions extendable from the outer container. Such a track system serves to guide the inner container 104 in and out of the ground and secure it in its elevated and accessible position.

The in-ground storage system also includes a lid assembly 126. In one embodiment of the invention, the lid assembly 126 includes a carrying handle 128, an outer sealing member 130, the outer sealing member including an outer lip portion having a substantially vertical outer wall; at least one gasket 132, and an inner sealing portion having a substantially vertical and threaded inner wall 134. The lid assembly can further include a digging tool 138 which can attach to the carrying handle 128 or any other suitable location. In other embodiments, a digging tool 138 can attach to the inner surface of the lid assembly.

The lid assembly 126 further includes an attachable compartment 136 which, in certain embodiments, attaches to the inner diameter of the lid assembly 126. The attachable compartment 136 includes a sealable cavity for the storage of a GPS enabled device. Persons skilled in the art will readily appreciate that such GPS enabled devices can be implemented as locating devices to be used on networked computers or smartphones. In embodiments of the invention, the attachable compartment 136 includes space for items such as credit cards, identification documents, cash, and jewelry. In other embodiments of the invention, the attachable compartment 136 can be larger so as to provide more storage space.

Persons skilled in the art will, however, appreciate that a screw top lid mechanism is specifically designed for this novel storage system. In embodiments of the invention, the lid assembly 126 includes a carrying handle 128 to provide a rigid grasping point as a user manipulates the inner container 114 and lid 126 as an assembled unit. In various embodiments of the invention, the lid assembly 126 is generally flat in order to create a flush position to the surface of the ground. The lid 126 assembly also has an indented area to retain debris and keep it from falling into either the cylindrically shaped outer container 102 or the cylindrically shaped inner container 114 when the lid 126 and cylindrically shaped inner container 126 are removed from the cylindrically shaped outer container 102. In some embodiments of the invention, a double or triple gasket system is employed for an extra secure seal.

Figure 2:
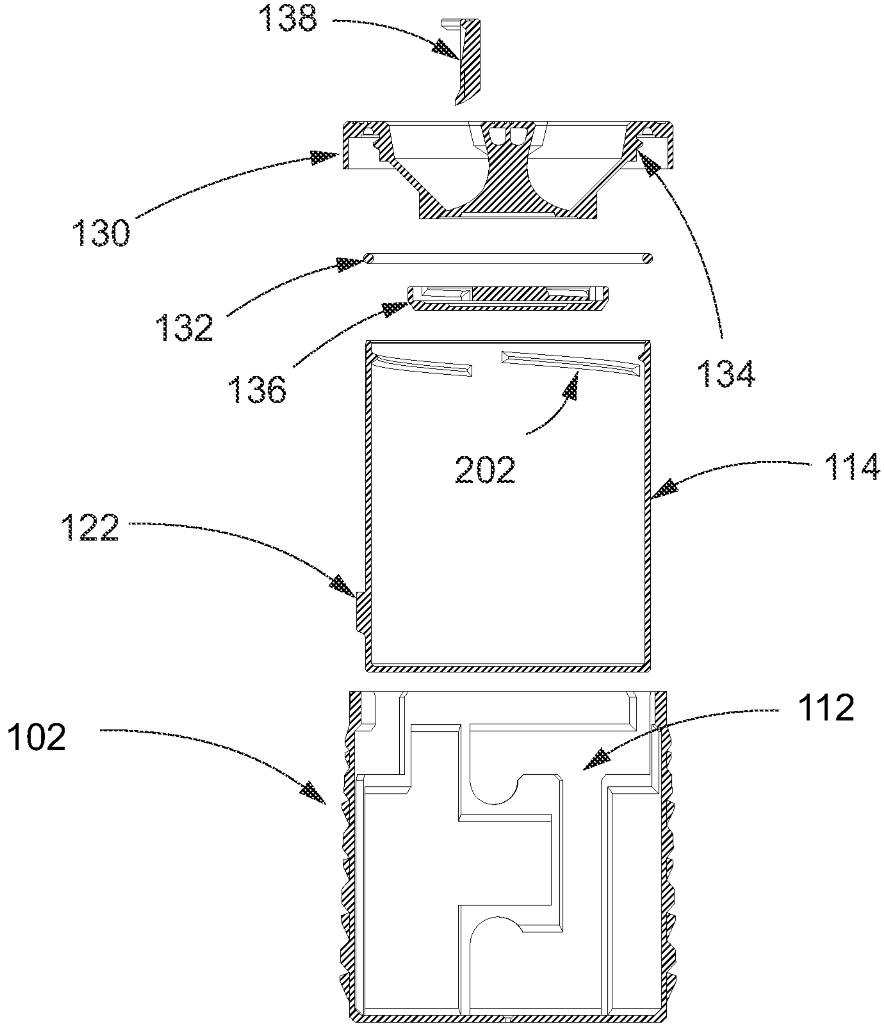
FIG. 2 is a cross sectional exploded view of an in-ground storage system in accordance with an embodiment of the invention.

FIG. 2 is a cross sectional exploded view of an in-ground storage system in accordance with an embodiment of the invention. The invention consists of components capable of assembly into one unit.

The invention includes a cylindrically shaped outer container 102. The outer container 102 provides a protective outer shell and a guide to maintain sturdiness. The cylindrically shaped outer container 102 includes a plurality of grooves 112 located on the inner diameter of the said cylindrically shaped outer container. The plurality of grooves are vertical or near vertical and horizontal or near horizontal. The plurality of grooves are configured to allow for the fitting and sliding of the inner container in such a manner where the cylindrically shaped inner container may extend from and retract into the cylindrically shaped outer container. Persons skilled in the art will readily appreciate that the grooves can be created by milling or stamping or molding. Persons skilled in the art will further appreciate that such a plurality of grooves can be configured to allow for multiple positions of the cylindrically shaped inner cylinder.

The invention further includes a cylindrically shaped inner container 114. The cylindrically shaped inner container 114 is a removable container in which personal valuable items are stored. The cylindrically shaped inner container 114 is a removable container in which personal valuable items are stored. The inner container 114 includes a bottom 116, an annular upper rim 118 and a substantially continuous side wall 120 extending from the bottom and terminating at the annular upper rim. In one embodiment of the invention, the cylindrically shaped inner container 114 has a plurality of radial pins 122 extending outward from the inner container near the bottom of the said inner container. The radial pins are configured to slide into the plurality of grooves 112 located in the inner diameter of the outer container 102 allowing for movement and stability to the system. Such radial pins 122 are designed to limit debris from crowding the track as well as to keep the inner container secured in various positions extendable from the outer container. Such a groove and pin system serves to guide the inner container 104 in and out of the ground and to secure the cylindrically shaped inner cylinder in an elevated and accessible position when the cylindrically shaped outer cylinder is stored in the ground.

The cylindrically shaped inner container 114 includes a threaded attachment means 202 located in the inner diameter of the annular upper rim 118. In other embodiments of the invention, the threaded attachment means 202 can be located on the outer diameter of the annular upper rim 118. Persons skilled in the art will appreciate that other means of securing the lid assembly 126 to the cylindrically shaped inner container 114 are available. The lid assembly 126 can attach to the cylindrically shaped inner container 114 and the cylindrically shaped outer cylinder 102. At least one gasket 132 can be used to create an airtight and watertight seal. Persons skilled in the art will appreciate that numerous types of materials can be used to create gaskets such as, but not limited to, rubber, elastomers or silicone plastics.

The in-ground storage system also includes a lid assembly 126. In one embodiment of the invention, the lid assembly 126 includes a carrying handle 128, an outer sealing member 130, the outer sealing member including an outer lip portion having a substantially vertical outer wall; at least one gasket 132, and an inner sealing portion having a substantially vertical and threaded inner wall 134. The lid assembly can further include a digging tool 138 which can attach to the carrying handle 128. The lid assembly further includes an attachable compartment 136 which, in certain embodiments, attaches to the inner diameter of the lid assembly 126. The attachable compartment 136 includes a sealable cavity for the storage of a GPS enabled device. Persons skilled in the art will readily appreciate that such GPS enabled devices can be implemented as locating devices to be used on networked computers or smartphones.

In embodiments of the invention, there are a plurality of grooves in the inner surface of the lid assembly 126 which serve to create a sealable lip around the top perimeter of both the cylindrically shaped outer container and the cylindrically shaped inner container for an improved sealable system. The purposes for using at least one gasket and a sealing system is to protect valuables from any and all possible elements. In various embodiments of the invention, differing lid conformations and shapes may be employed to better prevent debris from falling into the in-ground storage system.

The invention includes a means for securing the inner container in place when raised to the upper edge of the outer container 102. In one embodiment of the invention, a grooved track system allows for three positions—the in ground, or locked and secured, position which is its secured position when lowered all the way in the ground, the locked and elevated position which creates a raised effect so it will a certain distance above the ground, and an unlocked position which allows a user to completely remove the inner container and also put it back in for better usage. The locked and elevated position will keep dirt from falling into either the outer container or inner container while allowing a user to screw and unscrew the lid for fast and easy access. The special design on the track system creates resistance in both directions while screwing and unscrewing. Finally, a locked and carry position exists wherein the cylindrically shaped inner container 114 is nested fully inside the cylindrically shaped outer container 102 with the lid assembly 126 secured to the top of both containers. Persons having skill in the art will appreciate that such a track system may also be referred to as a bayonet mount system. It is to be understood that different means for securing the inner container 114 in place when raised to the upper edge of the outer container 102. By way of example, and not limitation, different grooved track systems can be configured. Other examples can include, but are not limited to, a screw mechanism or a bracket system or a spring-loaded system.

Figure 3:
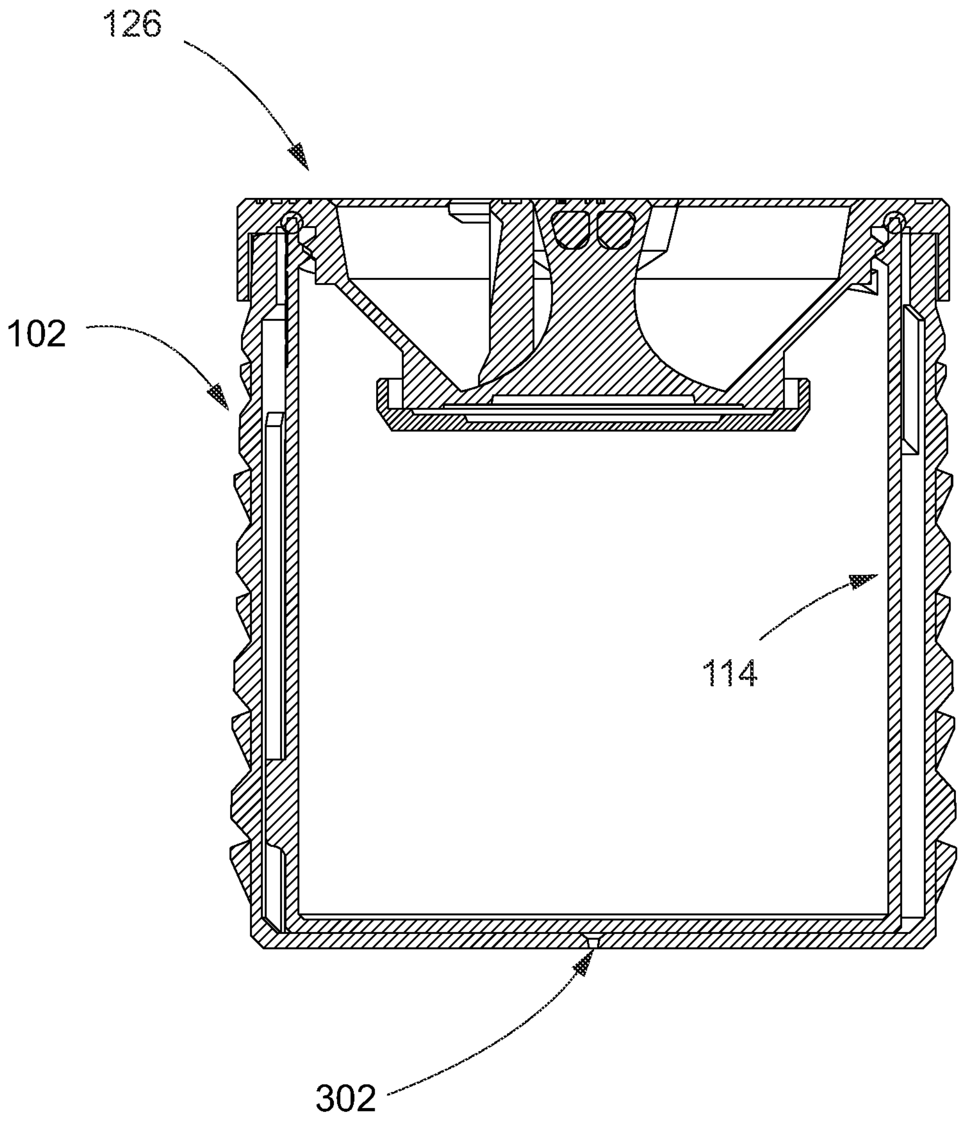
FIG. 3 is a cross sectional view of an in-ground storage system with the cylindrically shaped inner container nested inside the cylindrically shaped outer container in accordance with an embodiment of the invention.

FIG. 3 is a cross sectional view of an in-ground storage system with the inner container nested inside the outer container in accordance with an embodiment of the invention. In embodiments of the invention, the cylindrically shaped inner container 114 nests inside the cylindrically shaped outer container 102 and telescopically extends from and retracts into the cylindrically shaped outer container 102, the lid assembly 126 connectable to the cylindrically shaped outer container so as to create a portable unit. The cylindrically shaped outer container 102 includes a plurality of grooves 112 located on the inner diameter of the said cylindrically shaped outer container. The plurality of grooves 112 are configured to allow for the fitting and sliding of the inner container in such a manner where the cylindrically shaped inner container may extend from and retract into the cylindrically shaped outer container.

The bottom of the cylindrically shaped outer container may include a drainage system 302 such as, but not limited to, a plurality of apertures through which fluid can pass. The cylindrically shaped outer container 102 can include anti-seepage and anti-condensation systems as well.

Figure 4:
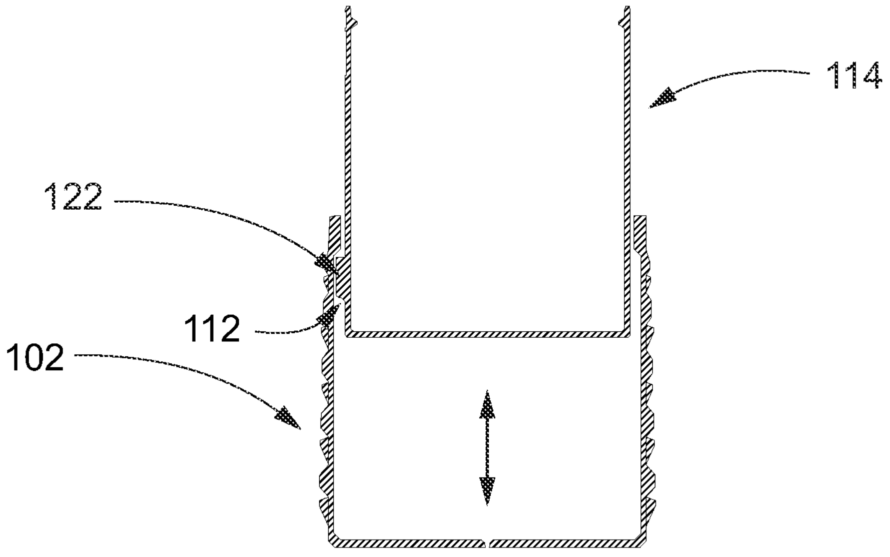
FIG. 4 is a cross sectional view of an in-ground storage system with the cylindrically shaped inner container raised from the cylindrically shaped outer container.

FIG. 4 is a perspective view of an in-ground storage system with the inner container nested inside the outer container in accordance with an embodiment of the invention. In embodiments of the invention, the cylindrically shaped outer container 102 connects with the lid assembly 126 to create a portable unit. In this view, the cylindrically shaped inner container 114 is in a locked and elevated position. The locked and elevated position will keep dirt and debris from falling into either the cylindrically shaped outer container or inner container while allowing a user to screw and unscrew the lid for fast and easy access. Persons having skill in the art will appreciate that mere twisting of the cylindrically shaped inner container 114 will remove the cylindrically shaped inner container's position from the locked and elevated position to one where a user can retract the inner cylinder into the cylindrically shaped outer container 102.

Figure 5:
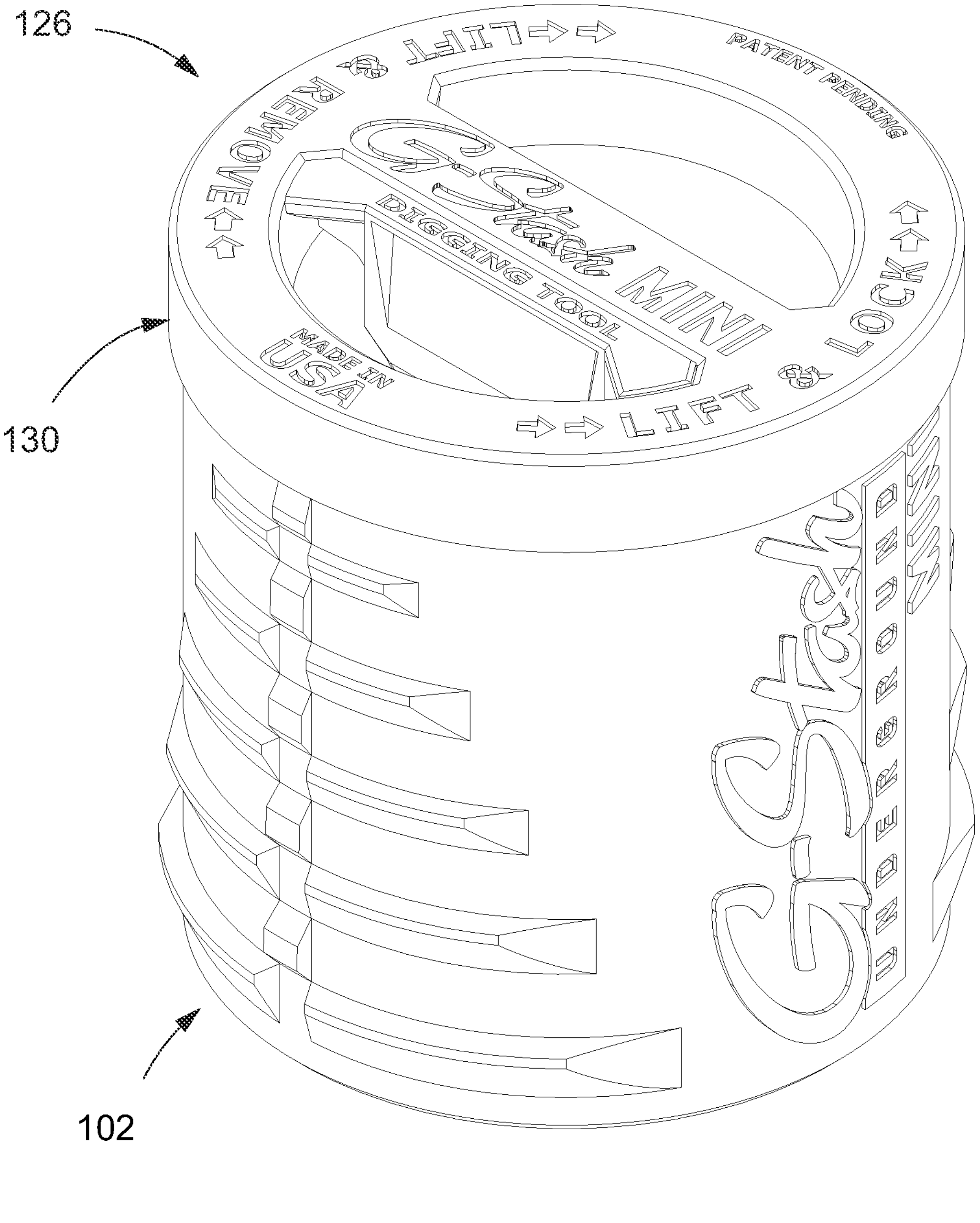
FIG. 5 is a perspective view of an in-ground storage system with the inner container nested inside the outer container in accordance with an embodiment of the invention.

FIG. 5 is a perspective view of an in-ground storage system with the inner container nested inside the outer container in accordance with an embodiment of the invention. In this view, the cylindrically shaped outer container 102 is in a locked and carry position. In an embodiment of the invention, the lid assembly 126 including an outer sealing member 130, the outer sealing member including an outer lip portion having a substantially vertical outer wall, is secured to the cylindrically shaped outer container 102. The outer lip portion serves to create a greater barrier against dirt and debris entering both the cylindrically shaped outer container and the cylindrically shaped inner container. A user can easily carry the in-ground storage system in such a locked and carry position from one location to another.

Persons having skill in the art will appreciate that numerous materials and combinations of materials may be used in making each component. By way of example, the containers may be made from one of many types of plastics known in the art. The gaskets may be a rubber or elastomeric material. Other materials such as, but not limited to, metals, wood or polymeric compounds can be used. It is to be further understood by persons having skill in the art that other means for securing the inner container in place can be employed.

The invention further discloses a method for storing valuables using an in-ground storage system comprising a cylindrically shaped outer container, the cylindrically shaped outer container having a bottom, an annular upper rim and a substantially continuous side wall extending from the bottom and terminating at the annular upper rim, the bottom and the side wall defining an internal cavity, the rim having a first connection; a cylindrically shaped inner container, the cylindrically shaped inner container having a bottom, an annular upper rim and a substantially continuous side wall extending from the bottom and terminating at the annular upper rim, the bottom and the side wall defining a cavity; and a lid assembly, the lid assembly comprising; an outer sealing member, said outer sealing member including an outer lip portion having a substantially vertical outer wall; a gasket, and an inner sealing portion having a substantially vertical and threaded outer wall. The method comprises the steps of digging a hole in the ground; installing the outer container of the in-ground storage system into the ground; inserting valuables into the inner cylinder; securing the lid assembly to the inner container; inserting the lid assembly and inner container into the outer container; securing the lid assembly and inner container to the outer container; and covering the in-ground storage system with dirt, rocks, sand or other objects to conceal the in-ground storage system from view.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the in-ground storage system and method, other equivalent or alternative methods of implementing the in-ground storage system and method according to the present invention will be apparent to those skilled in the art. Various aspects of the invention have been described above by way of illustration, and the specific embodiments disclosed are not intended to limit the invention to the particular forms disclosed. The particular implementation of the in-ground storage system and method may vary depending upon the particular context or application. By way of example, and not limitation, the in-ground storage system and method described in the foregoing was principally directed to small, personal items. However, similar techniques may instead be applied to larger in-ground storage systems which implementations of the present invention are contemplated as within the scope of the present invention. Furthermore, implementations of the invention may extend to greater lengths and widths depending on need. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the in-ground storage system and method are shown in some drawings and not others, persons skilled in the art will understand that this is for convenience. Each feature may be combined with any or all of the other features in accordance with the invention. The words “including,” “comprising,” “having,” and “with” as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. An in-ground storage system for storing valuables comprising:

a. a cylindrically shaped outer container, said cylindrically shaped outer container having a bottom, an annular upper rim and a substantially continuous side wall extending from the bottom and terminating at the annular upper rim, the bottom and the side wall defining an internal cavity;

b. a cylindrically shaped inner container, said cylindrically shaped inner container having a bottom, an annular upper rim and a substantially continuous side wall extending from the bottom and terminating at the annular upper rim, the bottom and the side wall defining an internal cavity; and c. a lid assembly, said lid assembly comprising;

i. an outer sealing member, said outer sealing member including an outer lip portion having a substantially vertical outer wall;

ii. at least one gasket, and iii. an inner sealing portion having a substantially vertical and threaded outer wall.

2. The in-ground storage system of claim 1 wherein the outer sealing member of the lid assembly connects with the annular upper rim of the cylindrically shaped outer container with the outer lip portion of the lid assembly covering the annular upper rim of the cylindrically shaped outer container.

3. The in-ground storage system storage system of claim 1 wherein the inner sealing portion and gasket of the lid assembly connects with the annular upper rim to form a watertight seal when attached to the cylindrically shaped inner container.

4. The in-ground storage system of claim 1 wherein the cylindrically shaped inner container includes a plurality of radial pins extending from the outer diameter of the said cylindrically shaped inner container, said radial pins configured to slide into a plurality of grooves.

5. The in-ground storage system of claim 1 wherein the cylindrically shaped outer container includes a plurality of grooves located on the inner diameter of the said cylindrically shaped outer container, said plurality of grooves configured to allow for the fitting and sliding of the inner container in such a manner where the cylindrically shaped inner container may extend from and retract into the cylindrically shaped outer container.

6. The in-ground storage system of claim 1 wherein the cylindrically shaped inner container nests inside the cylindrically shaped outer container and telescopically extends from the cylindrically shaped outer container, the lid assembly connectable to the cylindrically shaped outer container so as to create a portable unit.

7. The in-ground storage system of claim 1 wherein the cylindrically shaped outer container includes a drainage system.

8. The in-ground storage system of claim 1 wherein the lid assembly further comprises a carrying handle.

9. The in-ground storage system of claim 1 wherein the lid assembly further comprises an attachable compartment.

10. The in-ground storage system of claim 1 wherein the lid assembly further comprises an attachable digging tool.

11. An in-ground storage system for storing valuables comprising:

a. a ribbed, cylindrically shaped outer container, said ribbed cylindrically shaped outer container having a bottom, a threaded annular upper rim and a substantially continuous side wall extending from the bottom and terminating at the annular upper rim, the bottom and the side wall defining an internal cavity with the internal cavity including a plurality of grooves located on the inner diameter of the said cylindrically shaped outer container;

b. a cylindrically shaped inner container, said cylindrically shaped inner container having a bottom, an annular upper rim and a substantially continuous side wall extending from the bottom and terminating at the annular upper rim, configured to telescopically slide into and from the ribbed, cylindrically shaped outer container including a plurality of radial pins extending from the outer diameter of the said cylindrically shaped inner container;

c. a lid assembly, said lid assembly comprising:

i. a carrying handle;

ii. an outer sealing member, said outer sealing member including an outer lip portion having a substantially vertical outer wall;

iii. at least one gasket, and iv. an inner sealing portion having a substantially vertical and threaded inner wall.

12. The in-ground storage system for storing valuables of claim 11 wherein the outer sealing member of the lid assembly connects with the annular upper rim of the cylindrically shaped outer container with the outer lip portion of the lid assembly covering the annular upper rim of the cylindrically shaped outer container.

13. The in-ground storage system for storing valuables of claim 11 wherein the inner sealing portion and gasket of the lid assembly connects with the annular upper rim to form a watertight seal when attached to the cylindrically shaped inner container.

14. The in-ground storage system for storing valuables claim 11 wherein the cylindrically shaped inner container nests inside the cylindrically shaped outer container and telescopically extends from the cylindrically shaped outer container, the lid assembly connectable to the cylindrically shaped outer container so as to create a portable unit.

15. The in-ground storage system of claim 11 wherein the plurality of radial pins of the cylindrically shaped inner container slidingly fit in the plurality of grooves located on the inner diameter of the said cylindrically shaped outer container in such a manner so as to provide for multiple positions of the cylindrically shaped inner container.

16. The in-ground storage system of claim 11 wherein the cylindrically shaped outer container includes a drainage system.

17. The underground storage system of claim 11 wherein the lid assembly further comprises an attachable compartment for the storage of a GPS enabled device.

18. The underground storage system of claim 11 wherein the lid assembly further comprises an attachable digging tool.

19. The underground storage system of claim 11 wherein a sealable container is used inside the cylindrically shaped inner container.

20. A method for storing valuables using an in-ground storage system comprising a cylindrically shaped outer container, said cylindrically shaped outer container having a bottom, an annular upper rim and a substantially continuous side wall extending from the bottom and terminating at the annular upper rim, the bottom and the side wall defining an internal cavity, the rim having a first connection; a cylindrically shaped inner container, said cylindrically shaped inner container having a bottom, an annular upper rim and a substantially continuous side wall extending from the bottom and terminating at the annular upper rim, the bottom and the side wall defining a cavity; and a lid assembly, said lid assembly comprising; an outer sealing member, said outer sealing member including an outer lip portion having a substantially vertical outer wall; a gasket, and an inner sealing portion having a substantially vertical and threaded outer wall, the method comprising the steps of:

a. digging a hole in the ground;
b. installing the outer container of the in-ground storage system into the ground;
c. inserting valuables into the inner cylinder;
d. securing the lid assembly to the inner container;
e. inserting the lid assembly and inner container into the outer container;
f. securing the lid assembly and inner container to the outer container; and
g. covering the underground storage system with dirt, rocks, sand or other objects to conceal the underground storage system from view.

* * * * *